US012423324B1

(12) United States Patent
Naragoni et al.

(10) Patent No.: US 12,423,324 B1
(45) Date of Patent: Sep. 23, 2025

(54) METHOD AND SYSTEM FOR DYNAMIC DATA PARTITIONING AND EFFICIENT POLLING IN DISTRIBUTED MICROSERVICES ARCHITECTURE

(71) Applicant: JPMorgan Chase Bank, N.A., New York, NY (US)

(72) Inventors: Sairam Naragoni, Columbus, OH (US); Sean Sexton, Franklin, OH (US); Stanley M Devan, Mount Royal, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/650,952

(22) Filed: Apr. 30, 2024

(51) Int. Cl.
*G06F 16/27* (2019.01)
*G06F 16/22* (2019.01)
*G06F 16/23* (2019.01)

(52) U.S. Cl.
CPC ........ *G06F 16/278* (2019.01); *G06F 16/2255* (2019.01); *G06F 16/2343* (2019.01)

(58) Field of Classification Search
CPC . G06F 16/278; G06F 16/2255; G06F 16/2343
USPC .......................................................... 707/704
See application file for complete search history.

(56) References Cited

U.S. PATENT DOCUMENTS

| | | | |
|---|---|---|---|
| 8,930,312 B1 * | 1/2015 | Rath | G06F 16/278 |
| | | | 707/634 |
| 10,360,199 B2 * | 7/2019 | Korycki | G06F 16/2228 |
| 2005/0240625 A1 * | 10/2005 | Chang | G06Q 10/08 |
| 2020/0019622 A1 * | 1/2020 | Lu | G06F 16/137 |
| 2023/0353495 A1 * | 11/2023 | Sangle | H04L 47/127 |

\* cited by examiner

*Primary Examiner* — Kuen S Lu
(74) *Attorney, Agent, or Firm* — GREENBLUM & BERNSTEIN, P.L.C.

(57) ABSTRACT

A method and a system for utilizing dynamic data partitioning to ensure consistency of event publications with associated business transactions in a distributed microservices architecture in order to optimize efficiency in polling data are provided. The method includes: defining a hash space that includes a range of assignable hash values; deploying a respective instance of each microservice to form a cluster of microservices within the distributed microservices architecture; allocating a respective subset of the hash space to each microservice; and facilitating a data polling capability with respect to a data table based on the allocated respective subset of the hash space and the deployed respective instance for each microservice.

17 Claims, 9 Drawing Sheets

METHOD AND SYSTEM FOR DYNAMIC DATA PARTITIONING AND EFFICIENT POLLING IN DISTRIBUTED MICROSERVICES ARCHITECTURE

BACKGROUND

1. Field of the Disclosure

This technology relates to methods and systems for utilizing dynamic data partitioning to ensure consistency of event publications with associated business transactions in a distributed microservices architecture in order to optimize efficiency in polling data.

2. Background Information

Microservices architecture has gained popularity for its scalability, flexibility and resilience. However, polling for data from a database in such an architecture can lead to performance bottlenecks, redundant data reads, and transaction contention.

Conventional polling for data in microservices involves either acquiring a lock on the database by the process that is polling the data or allowing only a single process to access the database. This may lead to the following challenges: 1) Inefficiency: Each microservice might poll the entire database, leading to redundant work and overloading the database. In distributed relational databases, it might lead to heavy transaction contention. 2) Scalability: As the number of microservices grows, so does the load on the database, affecting the overall performance. 3) Load Imbalance: Instances of the microservice that are unable to acquire lock on the data due to contention will be underutilized, thereby reducing cost efficiency.

Accordingly, there is a need for a mechanism for utilizing dynamic data partitioning to ensure consistency of event publications with associated business transactions in a distributed microservices architecture in order to optimize efficiency in polling data.

SUMMARY

The present disclosure, through one or more of its various aspects, embodiments, and/or specific features or sub-components, provides, inter alia, various systems, servers, devices, methods, media, programs, and platforms for utilizing dynamic data partitioning to ensure consistency of event publications with associated business transactions in a distributed microservices architecture in order to optimize efficiency in polling data.

According to an aspect of the present disclosure, a method for performing data partitioning in a distributed microservices architecture is provided. The method is implemented by at least one processor. The method includes: defining, by the at least one processor, a first hash space that includes a range of assignable hash values; deploying, by the at least one processor, a respective instance of each of a plurality of microservices to form a cluster of microservices within the distributed microservices architecture; allocating a respective subset of the first hash space to each microservice; and facilitating, by the least one processor, a data polling capability with respect to a first data table based on the allocated respective subset of the first hash space and the deployed respective instance for each microservice.

The method may further include determining, based on the deployed respective instance for each microservice, which microservice is a leader of the cluster of microservices and which microservices are followers within the cluster of microservices.

The determining may include electing the leader based on an assessment of which deployed respective instance is fastest to acquire a lock on the first data table.

Alternatively, the determining may include electing the leader based on an assessment of which deployed respective instance has a lowest associated row number.

The method may further include: receiving, from each microservice at a regular time interval, a respective heart beat signal; and recording, based on the received respective heart beat signal, a corresponding heart beat timestamp.

The method may further include: determining, when the respective heart beat signal is not received from a particular microservice at the regular time interval, that the particular microservice has left the cluster of microservices; and reallocating a resized respective subset of the first hash space to each microservice that remains in the cluster of microservices.

The method may further include: receiving the respective heart beat signal from a newly added microservice that has not previously been included in the cluster of microservices; and reallocating a resized respective subset of the first hash space to each microservice included in the cluster of microservices based on a presence of the newly added microservice.

The data polling capability may include an ability to retrieve, from the first data table, a record having a status indicating that the record is new, and an ability to update the status of the record after retrieval to indicate one from among that the record has been processed and that the record has an error.

Each respective record included in the first data table may be associated with a corresponding pre-computed hash value. The data polling capability may further include an ability to partition the first data table based on matching each pre-computed hash value with the allocated respective subset of the first hash space for a particular microservice included in the cluster of microservices.

According to another exemplary embodiment, a computing apparatus for performing data partitioning in a distributed microservices architecture is provided. The computing apparatus includes a processor; a memory; and a communication interface coupled to each of the processor and the memory. The processor is configured to: define a first hash space that includes a range of assignable hash values; deploy a respective instance of each of a plurality of microservices to form a cluster of microservices within the distributed microservices architecture; allocate a respective subset of the first hash space to each microservice; and facilitate a data polling capability with respect to a first data table based on the allocated respective subset of the hash space and the deployed respective instance for each microservice.

The processor may be further configured to determine, based on the deployed respective instance for each microservice, which microservice is a leader of the cluster of microservices and which microservices are followers within the cluster of microservices.

The processor may be further configured to elect the leader based on an assessment of which deployed respective instance is fastest to acquire a lock on the first data table.

Alternatively, the processor may be further configured to elect the leader based on an assessment of which deployed respective instance has a lowest associated row number.

The processor may be further configured to: receive, from each microservice via the communication interface at a regular time interval, a respective heart beat signal; and record, based on the received respective heart beat signal, a corresponding heart beat timestamp.

The processor may be further configured to: determine, when the respective heart beat signal is not received from a particular microservice at the regular time interval, that the particular microservice has left the cluster of microservices; and reallocate a resized respective subset of the first hash space to each microservice that remains in the cluster of microservices.

The processor may be further configured to: receive the respective heart beat signal from a newly added microservice that has not previously been included in the cluster of microservices; and reallocate a resized respective subset of the first hash space to each microservice included in the cluster of microservices based on a presence of the newly added microservice.

The data polling capability may include an ability to retrieve, from the first data table, a record having a status indicating that the record is new, and an ability to update the status of the record after retrieval to indicate one from among that the record has been processed and that the record has an error.

Each respective record included in the first data table may be associated with a corresponding pre-computed hash value. The data polling capability may further include an ability to partition the first data table based on matching each pre-computed hash value with the allocated respective subset of the first hash space for a particular microservice included in the cluster of microservices.

According to yet another exemplary embodiment, a non-transitory computer readable storage medium storing instructions for performing data partitioning in a distributed microservices architecture is provided. The storage medium includes executable code which, when executed by a processor, causes the processor to: define a first hash space that includes a range of assignable hash values; deploy a respective instance of each of a plurality of microservices to form a cluster of microservices within the distributed microservices architecture; allocate a respective subset of the first hash space to each microservice; and facilitate a data polling capability with respect to a first data table based on the allocated respective subset of the first hash space and the deployed respective instance for each microservice.

When executed, the executable code may further cause the processor to determine, based on the deployed respective instance for each microservice, which microservice is a leader of the cluster of microservices and which microservices are followers within the cluster of microservices.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
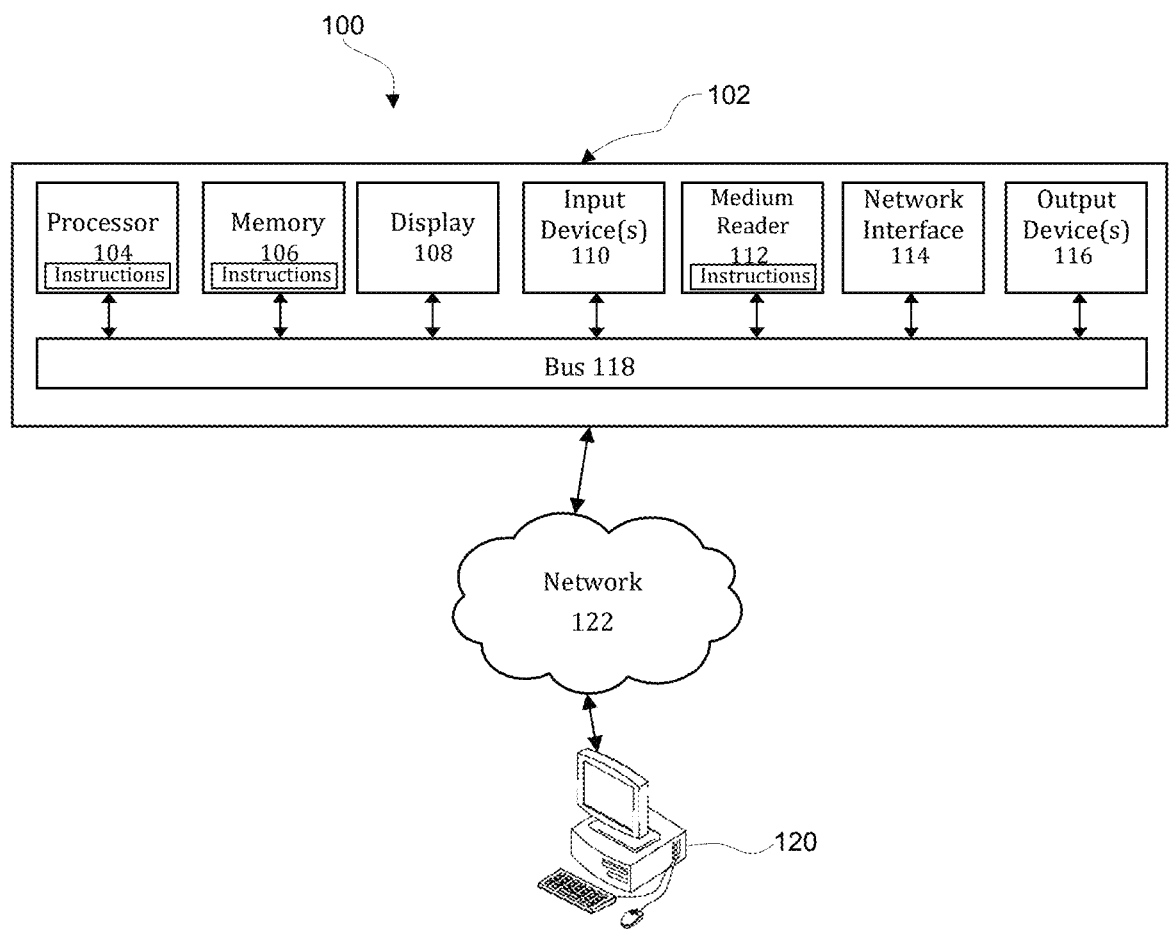
FIG. 1 illustrates a system diagram of a computer system, according to an embodiment.

FIG. 1 illustrates a system diagram of a system 100 in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for utilizing dynamic data partitioning to ensure consistency of event publications with associated business transactions in a distributed microservices architecture in order to optimize efficiency in polling data.

Figure 2:
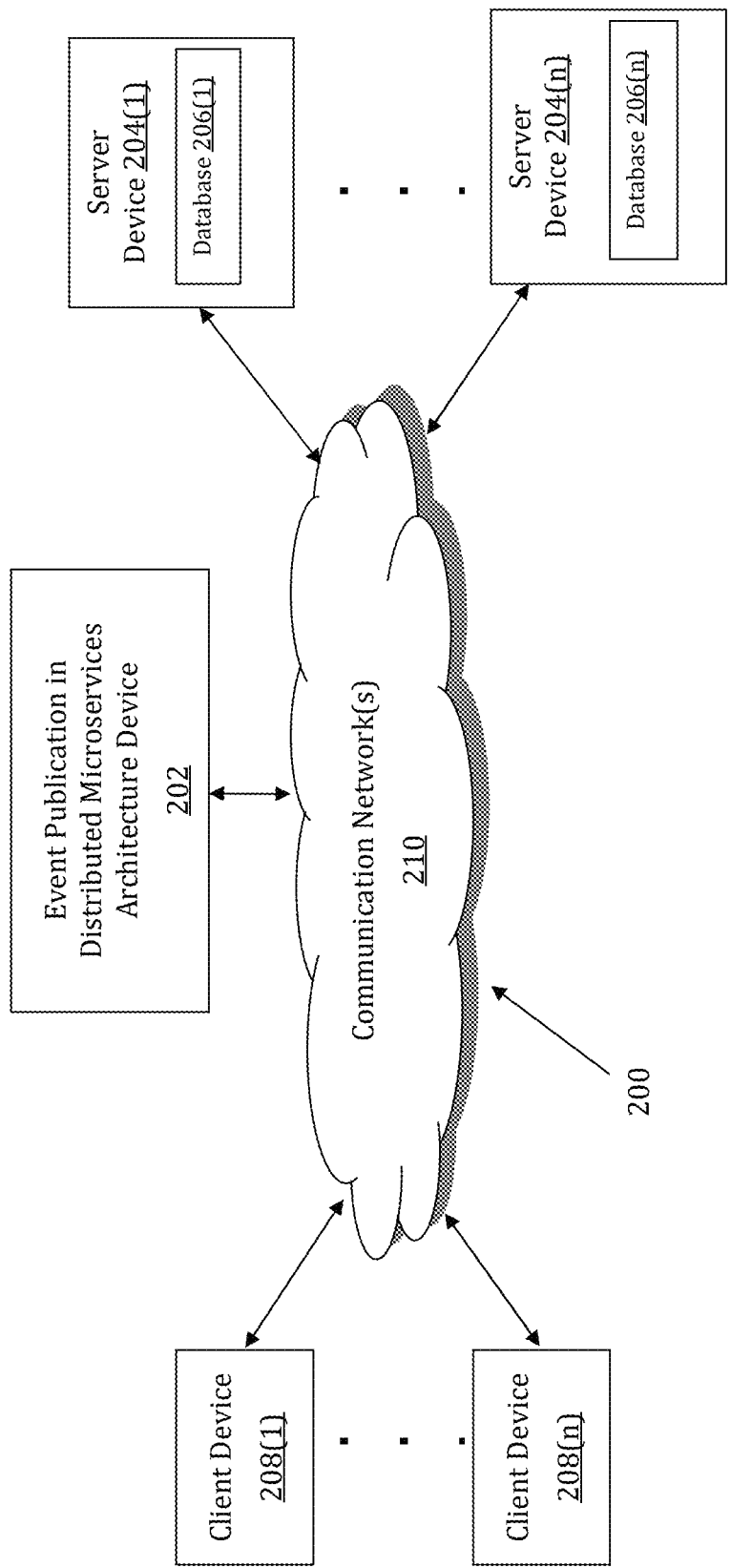
FIG. 2 illustrates a network diagram of a network environment, according to an embodiment.

Referring to FIG. 2, a schematic of a network environment 200 for implementing a method for utilizing dynamic data partitioning to ensure consistency of event publications with associated business transactions in a distributed microservices architecture in order to optimize efficiency in polling data is illustrated. In some embodiments, the method may be executable on any networked computer platform, such as, for example, a personal computer (PC).

The method for utilizing dynamic data partitioning to ensure consistency of event publications with associated business transactions in a distributed microservices architecture in order to optimize efficiency in polling data may be implemented by an Event Publication in Distributed Microservices Architecture (EPDMA) device 202. The EPDMA device 202 may be the same or similar to the computer system 102 as described with respect to FIG. 1. The EPDMA device 202 may store one or more applications that may include executable instructions that, when executed by the EPDMA device 202, cause the EPDMA device 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the EPDMA device 202 itself, may be located in virtual server(s) running in a cloud-based computing environment rather than being tied to one or more specific physical network computing devices. Also, the application(s) may be running in one or more virtual machines (VMs) executing on the EPDMA device 202. Additionally, in one or more embodiments, virtual machine(s) running on the EPDMA device 202 may be managed or supervised by a hypervisor.

In the network environment 200 of FIG. 2, the EPDMA device 202 may be coupled to a plurality of server devices 204(1)-204(n) that hosts a plurality of databases 206(1)-206(n), and also to a plurality of client devices 208(1)-208(n) via communication network(s) 210. A communication interface of the EPDMA device 202, such as the network interface 114 of the computer system 102 of FIG. 1, may operatively couple and communicate between the EPDMA device 202, the server devices 204(1)-204(n), and/or the client devices 208(1)-208(n), which may all be coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the EPDMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and EPDMA devices that efficiently implement a method for utilizing dynamic data partitioning to ensure consistency of event publications with associated business transactions in a distributed microservices architecture in order to optimize efficiency in polling data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The EPDMA device 202 may be a standalone device or integrated with one or more other devices or apparatuses, such as one or more of the server devices 204(1)-204(n), for example. In one particular example, the EPDMA device 202 may include or be hosted by one of the server devices 204(1)-204(n), and other arrangements are also possible. Moreover, one or more of the devices of the EPDMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the EPDMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts databases 206(1)-206(n).

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the EPDMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the EPDMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the network environment 200 with the EPDMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are mere examples, as many variations of the specific hardware and software used to implement the examples are possible, as will be appreciated by those skilled in the relevant art(s).

One or more of the devices depicted in the network environment 200, such as the EPDMA device 202, the server devices 204(1)-204(n), or the client devices 208(1)-208(n), for example, may be configured to operate as virtual instances on the same physical machine. In other words, one or more of the EPDMA device 202, the server devices 204(1)-204(n), or the client devices 208(1)-208(n) may operate on the same physical device rather than as separate devices communicating through communication network(s) 210. Additionally, there may be more or fewer EPDMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
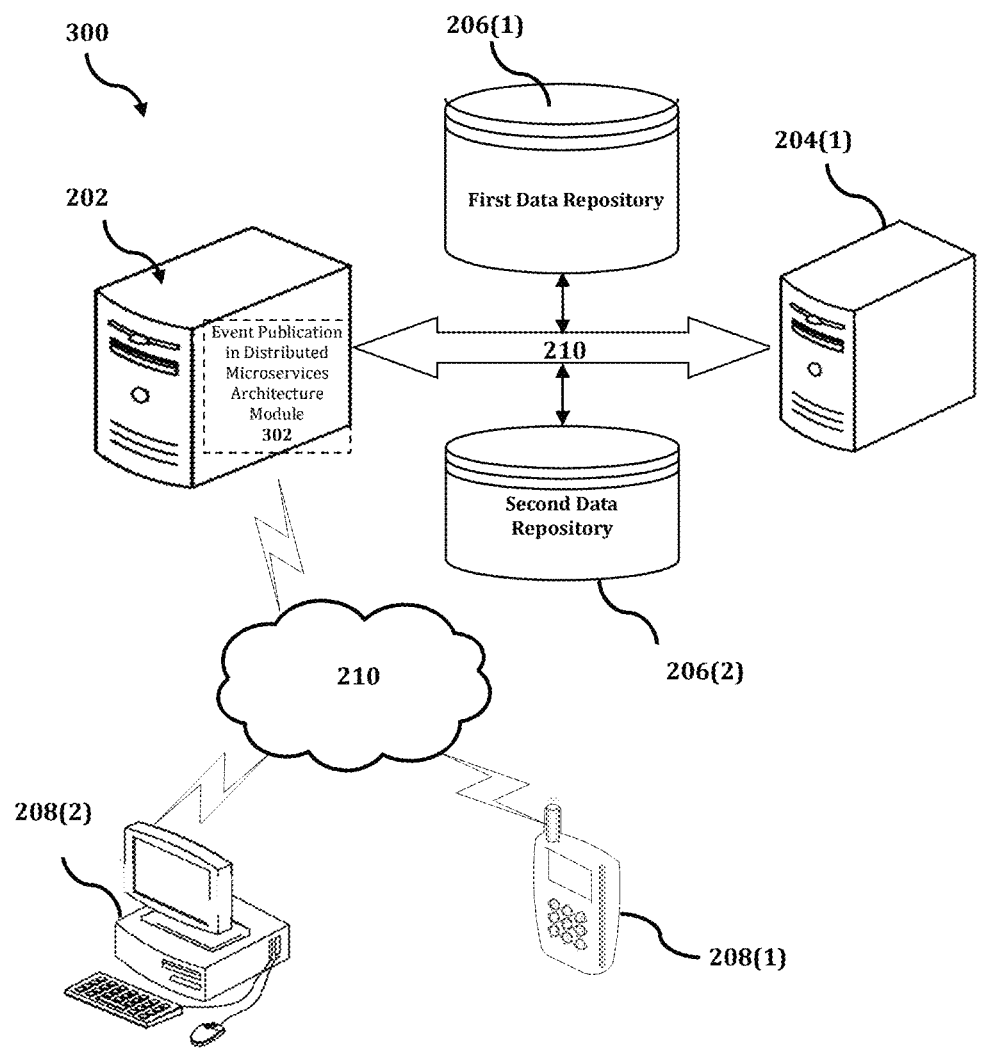
FIG. 3 illustrates a system diagram of a system, according to an embodiment.

The EPDMA device 202 is described and illustrated in FIG. 3 as including an event publication in distributed microservices architecture module 302, although it may include other rules, policies, modules, databases, or applications, for example. As will be described below, the event publication in distributed microservices architecture module 302 may be configured to implement a method for utilizing dynamic data partitioning to ensure consistency of event publications with associated business transactions in a distributed microservices architecture in order to optimize efficiency in polling data.

A system 300 for implementing a mechanism for utilizing dynamic data partitioning to ensure consistency of event publications with associated business transactions in a distributed microservices architecture in order to optimize efficiency in polling data by utilizing the network environment of FIG. 2 is illustrated in FIG. 3. Specifically, a first client device 208(1) and a second client device 208(2) are illustrated as being in communication with EPDMA device 202. In this regard, the first client device 208(1) and the second client device 208(2) may be "clients" of the EPDMA device 202 and are described herein as such. Nevertheless, it is to be known and understood that the first client device 208(1) and/or the second client device 208(2) need not necessarily be "clients" of the EPDMA device 202, or any entity described in association therewith herein. Any additional or alternative relationship may exist between either or both of the first client device 208(1) and the second client device 208(2) and the EPDMA device 202, or no relationship may exist.

Further, EPDMA device 202 is illustrated as being able to access a first data repository 206(1) and a second data repository 206(2). The event publication in distributed microservices architecture module 302 may be configured to access these databases for implementing a method for utilizing dynamic data partitioning to ensure consistency of event publications with associated business transactions in a distributed microservices architecture in order to optimize efficiency in polling data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an embodiment, either or both of the first client device 208(1) and the second client device 208(2) may communicate with the EPDMA device 202 via broadband and/or cellular communication. Of course, these embodiments are not limiting or exhaustive.

Upon being started, the event publication in distributed microservices architecture (EPDMA) module 302 executes a process for utilizing dynamic data partitioning to ensure consistency of event publications with associated business transactions in a distributed microservices architecture in order to optimize efficiency in polling data.

Figure 4:
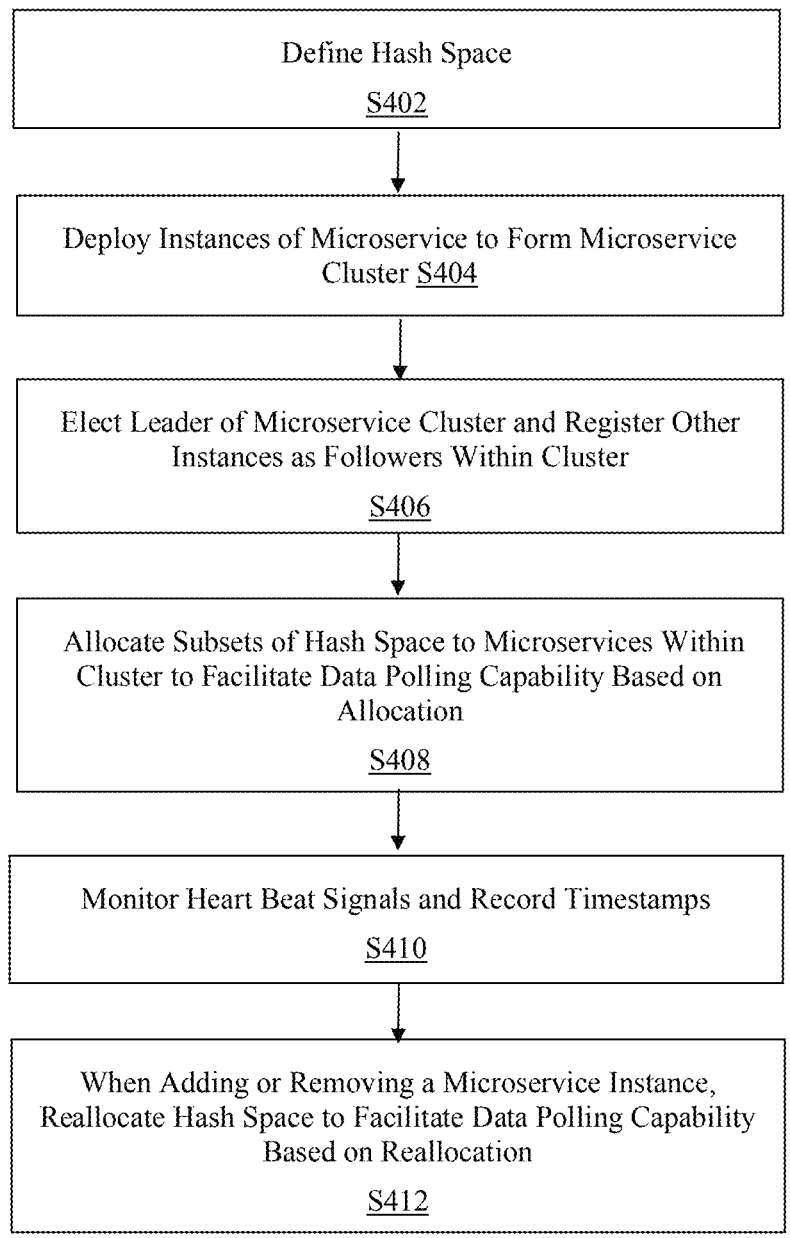
FIG. 4 illustrates a process diagram of a process for utilizing dynamic data partitioning, according to an embodiment.

Referring to FIG. 4, a process 400 for utilizing dynamic data partitioning to ensure consistency of event publications with associated business transactions in a distributed microservices architecture in order to optimize efficiency in polling data is illustrated, according to an embodiment.

In process 400, at step S402, the EPDMA module 302 may define a hash space that includes a range of assignable hash values. For example, the hash space may be defined as corresponding to a range from 1 to 100 with 100 assignable hash values.

Then, at step S404, the EPDMA module 302 may deploy respective instances of microservices in order to form a particular cluster of microservices.

At step S406, the EPDMA module 302 may elect one microservice to function as a leader of the cluster. In an embodiment, each cluster may include a single leader, and the remaining microservices may be followers. The election of the leader may be based on which instance is fastest to acquire a lock on a data table from which the microservices will perform data polling. Alternatively, the election of the leader may be based on which instance has a lowest associated row number.

At step S408, the EPDMA module 302 may allocate a respective subset of the first hash space to each microservice included in the cluster. Further to the example above, if a particular microservice cluster includes four microservices, then each microservice may be allocated a subset that includes 25 hash values, i.e., 1-25, 26-50, 51-75, and 76-100. The allocation effectively facilitates a data polling capability with respect to a particular data table based on the assigned microservice instances and the allocations of the hash space. In an embodiment, the data polling capability may include an ability to retrieve any record having a status indicating that the record is new, i.e., status="NEW", and an ability to update the status of the record after retrieval to indicate either that the record has been processed, i.e., status="PROCESSED", or that the record has an error, i.e., status="ERROR".

At step S410, the EPDMA module 302 may monitor respective heartbeat signals that may be received from each microservice instance in the cluster at a regular time interval. When each heartbeat signal is received, a corresponding timestamp may be recorded as a way of tracking the continued viability of the microservice instance within the cluster.

At step S412, the EPDMA module 302 may reallocate the hash space whenever there is an occurrence of either adding a new microservice instance or removing a microservice instance that has left the cluster. In this aspect, the EPDMA module 302 may detect a new microservice instance by receiving a heartbeat signal that is different from those that are expected to be received from the previously present microservice instances. Conversely, when there is an absence of a heartbeat signal that would be expected, this may indicate that the corresponding microservice instance has left the cluster and should therefore be removed. In either circumstance, the hash space may be reallocated in order to ensure that roughly equal subsets of hash values are allocated to the current microservice instances at any particular time. Accordingly, further to the example above, if a new microservice is to be added, thus yielding five microservice instances within the cluster, then the hash space may be reallocated so that each of the five microservice instances is allocated a corresponding subset of about 20 hash values. Conversely, if one of the four microservice instances has left the cluster, thus yielding three microservice instances within the cluster, then the hash space may be reallocated so that each of the three instances is allocated a corresponding subset of about 33 or 34 hash values. In addition, the reallocation may effectively facilitate the data polling capability with respect to the particular data table based on the assigned microservice instances and the reallocations of the hash space.

In an embodiment, each respective record included in the data table may be associated with a corresponding pre-computed hash value, which may be assigned either randomly or by using a hash key. The data polling capability may further include an ability to partition the first data table based on matching each pre-computed hash value with the allocated respective subset of the hash space for a particular microservice included in the cluster of microservices. Accordingly, if the cluster includes four microservice instances and the hash space includes a range of 100 hash values, and if a particular record in the data table is associated with a hash value of 63, then that hash value would match the subset of the third microservice instance, which has been allocated the subset that includes hash values between 51 and 75.

As described herein by implementing an instance coordinator, data distribution and retrieval may be managed more efficiently. Some aspects of the instance coordinator are as follows: 1) Hash space, which may be defined as the range of hash values that can be assigned to the active microservices. 2) Range allocations: The hash space may be dynamically split into non-overlapping contiguous ranges to each microservice. The range may be determined based on the number of active microservices. A range that is allocated to a microservice is accessible in the environment of the microservice to be used for polling. 3) Instance coordination, which may oversee the dynamic allocation of ranges, thereby ensuring a balanced distribution across microservices.

For example, if the hash space is configured as 100, 0-99 would be the valid range that the instance coordinator can use to allocate ranges to each microservice. If there are four active instances of a microservice, the instance coordinator may allocate the ranges as shown in Table 1 below:

TABLE 1

Instance Coordinator Registry with 4 active microservices

| Instance ID | Allocated range |
|---|---|
| 1 | 00-24 |
| 2 | 25-49 |
| 3 | 50-74 |
| 4 | 75-99 |

Figure 5:
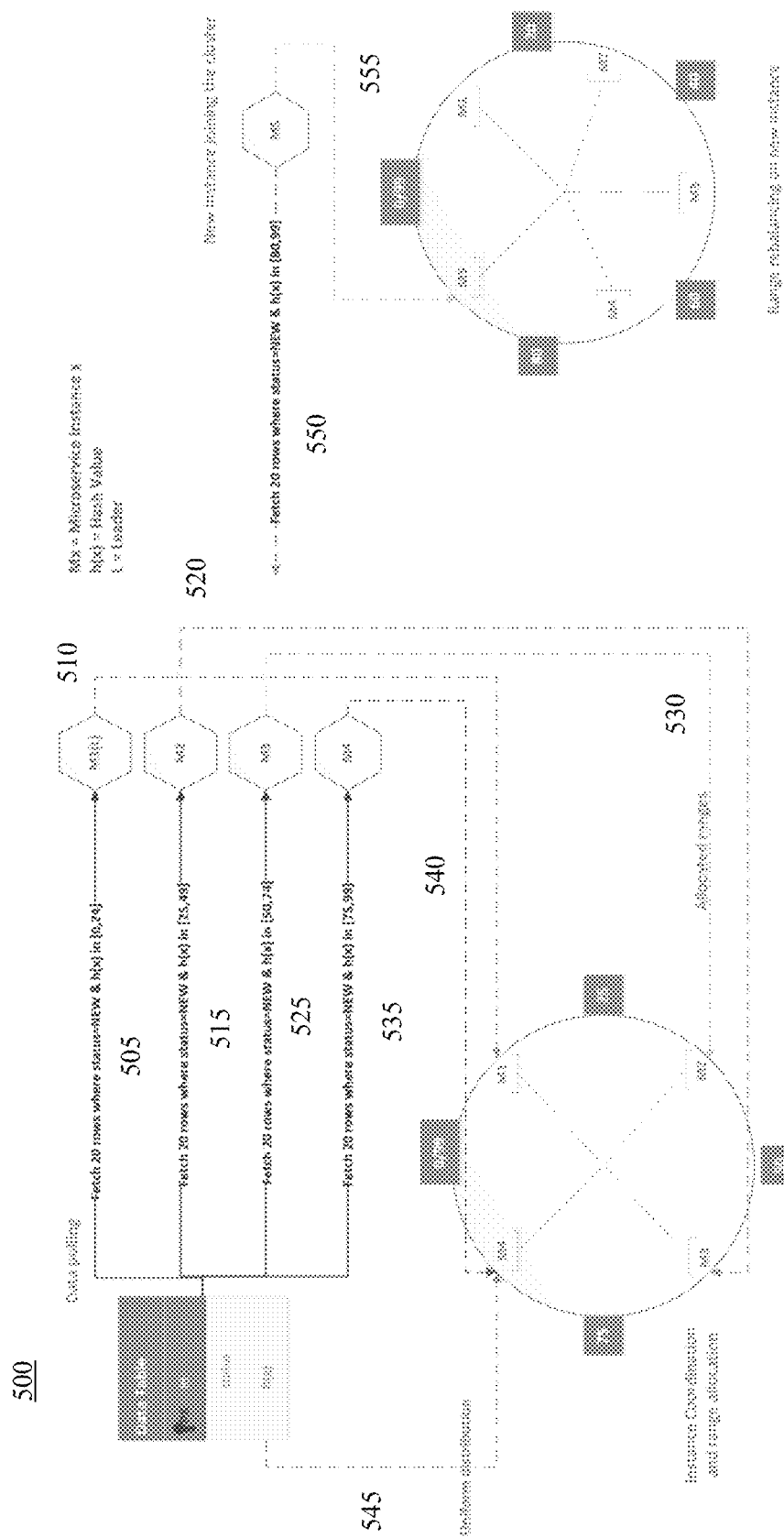
FIG. 5 illustrates a flow diagram that illustrates data partitioning and polling, according to an embodiment.

FIG. 5 illustrates a flow diagram 500 that illustrates data partitioning and polling using the instance coordinator in a system and method for utilizing dynamic data partitioning to ensure consistency of event publications with associated business transactions in a distributed microservices architecture in order to optimize efficiency in polling data, according to an embodiment. As illustrated in FIG. 5 and consistent with the example of Table 1, in operation 505, when the status is new and the allocated range is 0-24, then 20 rows are fetched and allocated to the first instance M1 in operation 510; in operation 515, when the status is new and the allocated range is 25-49, then 20 rows are fetched and allocated to the second instance M3 in operation 520; in operation 525, when the status is new and the allocated range is 50-74, then 20 rows are fetched and allocated to the third instance M2 in operation 530; and in operation 535, when the status is new and the allocated range is 75-99, then 20 rows are fetched and allocated to the fourth instance in operation 540. In operation 545, the data table checks to make sure that there is a uniform distribution within the instance coordinator.

If a new microservice joins the cluster, the instance coordinator may rebalance (such as automatically, periodically, and/or manually) the range configuration as shown in Table 2 below:

TABLE 2

Instance Coordinator Registry with 5 active microservices

| Instance ID | Allocated range |
|---|---|
| 1 | 00-19 |
| 2 | 20-39 |
| 3 | 40-59 |

TABLE 2-continued

| Instance Coordinator Registry with 5 active microservices | |
|---|---|
| Instance ID | Allocated range |
| 4 | 60-79 |
| 5 | 80-99 |

Referring again to FIG. 5, when a new microservice joins the cluster, in operation 555, it is assigned to the new instance M5, and the automatic rebalancing is performed in operation 550.

Referring to Table 3 below, a microservice coordinator registry may be provided in a data repository 206(n) that includes a registry of active microservices and their assigned ranges. The microservice coordinator registry may be a distributed cache or a table in a database. At the start of an instance, a microservice may register itself in the coordinator registry. In an embodiment, and as shown in Table 3 below, the coordinator registry may include some or all of the following columns: A) Instance ID: each microservice may generate and store its identity in this column. B) Group Name: one registry may be used for establishing coordination across multiple groups of microservices. C) Start Range: the start value of the allocated range, where −1 may be the default value. D) End Range: the end value of the allocated range, where −1 may be the default value. E) Heartbeat Timestamp: each microservice may send a heartbeat signal at regular intervals and update the heartbeat timestamp in the registry. This column may be used by the instance coordinator to detect dead nodes. F) Is Leader: may store whether the current instance is the leader in the cluster. An instance that is not a leader may be referred to as a follower.

TABLE 3

| Instance coordinator registry with 1 new active microservice | | | | | |
|---|---|---|---|---|---|
| instance_id | group_name | start_range | end_range | hb_timestamp | is_leader |
| 1 | instance-coordination | −1 | −1 | now( ) | N |

A follower may have the following responsibilities. A) Initialization: every follower at the start of the microservice may register itself in the coordinator registry. B) Heartbeat signal: a follower may update the timestamp to current time on every heart beat interval. C) Eviction: in the event of a graceful shutdown, a follower may evict itself from the coordinator registry, which may be used to initiate a rebalance in the cluster as soon as possible.

Figure 6:
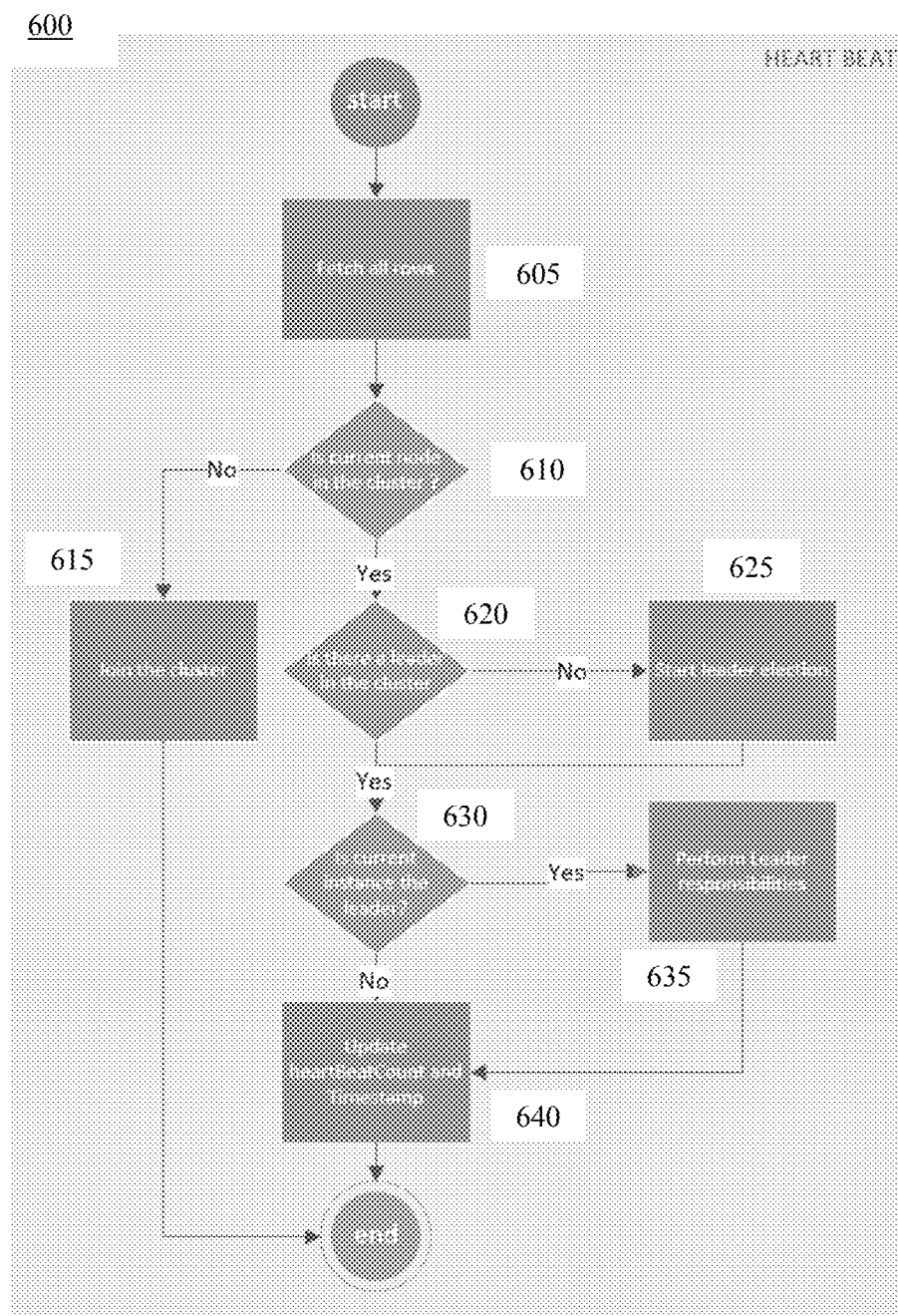
FIG. 6 illustrates a flow diagram for a heartbeat signal, according to an embodiment.

FIG. 6 is a flow diagram 600 for a heartbeat signal in a system and method for utilizing dynamic data partitioning to ensure consistency of event publications with associated business transactions in a distributed microservices architecture in order to optimize efficiency in polling data, according to an exemplary embodiment. As shown in FIG. 6, in operation 605, all rows are fetched, and then, in operation 610, a determination is made as to whether a current node is in the cluster. When a determination is made that the current node is not in the cluster, then in operation 615, the node joins the cluster, and the process 600 ends. Conversely, when a determination is made that the current node is in the cluster, then at operation 620, a determination is made as to whether there is a leader in the cluster. When a determination is made that there is no leader in the cluster, then at operation 625, a leader election is started in order to elect a leader. When a leader has been elected or a determination has been made that there is a leader in the cluster, then at operation 630, a determination is made as to whether the current instance is the leader. When a determination is made that the current instance is the leader, then at operation 635, the leader responsibilities are performed by the current instance. Then, after the leader responsibilities have been performed or a determination is made that the current instance is not the leader, then at operation 640, the heartbeat count and the time stamp are updated, and the process 600 then ends.

In some embodiments, the leader in the cluster may be elected following a leader election policy. If the cluster ends up with multiple leaders during the election, a re-election may take place. Alternatively, one of the leaders may demote the other leaders to followers. In some embodiments, a first to acquire lock policy may be used to elect a leader where the first instance to acquire lock on the data table is elected as the leader. In other embodiments, a lowest row number policy may be used to elect a leader where the instance with lowest row number will always be elected as the leader.

Figure 7:
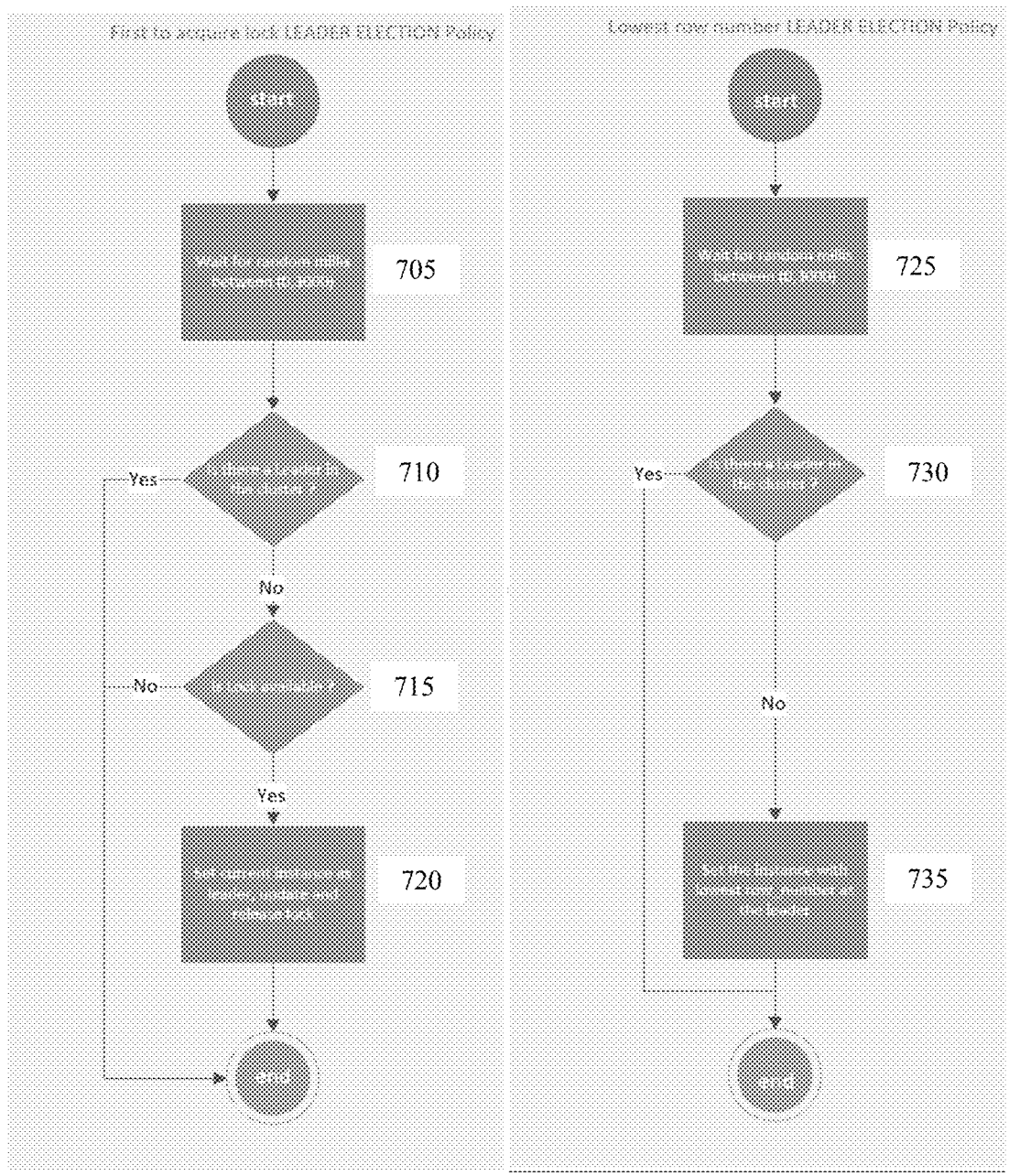
FIG. 7 illustrates a flow diagram for leader election policies, according to an embodiment.

FIG. 7 is a flow diagram 700 for leader election policies in a system and method for utilizing dynamic data partitioning to ensure consistency of event publications with associated business transactions in a distributed microservices architecture in order to optimize efficiency in polling data, according to an exemplary embodiment. On the left side of flow diagram 700, the first to acquire lock leader election policy is illustrated. In operation 705, a random millisecond is selected, and then, in operation 710, a determination is made as to whether there is a leader in the cluster. When a determination is made that there is a leader in the cluster, then there is no need to elect a leader and so the process ends. Conversely, when a determination is made that there is no leader in the cluster, then at operation 715, a determination is made as to whether a lock is available. When no lock is available, then the process ends, as there has been no acquisition of lock. However, when a lock is available, then at operation 720, the current instance is set as leader, and the lock is updated and released.

On the right side of flow diagram 700, the lowest row number leader election policy is illustrated. In operation 725, a random millisecond is selected, and then, in operation 730, a determination is made as to whether there is a leader in the cluster. When a determination is made that there is a leader in the cluster, then there is no need to elect a leader and so the process ends. Conversely, when a determination is made that there is no leader in the cluster, then at operation 735, the instance having the lowest row number is set as leader.

Table 4 below shows leader responsibilities associated with an instance coordinator registry with two active microservices and a successful leader election:

TABLE 4

Instance coordinator registry with two active microservices and a successful leader election

| instance_id | group_name | start_range | end_range | hb_timestamp | is_leader |
|---|---|---|---|---|---|
| 1 | instance-coordination | −1 | −1 | now( ) | Y |
| 2 | instance-coordination | −1 | −1 | now( ) | N |

The state of the coordinator registry may be managed by the leader of the cluster. A leader may be configured to perform the following: A) New instance addition: when a new instance joins the cluster, the leader may initiate a rebalance of ranges to assign start and end range to the newly joined instance. The leader may check for new instances in the cluster on every heartbeat signal by reading the start and end range values. Any instances with −1 as start and end range may be considered as new instances in the coordination cluster. A new instance may start polling when start and end range values are allocated to the instance by the leader of the cluster. Table 5 below shows an example of an instance coordinator registry with one new active microservice joining the cluster:

TABLE 5

Instance coordinator registry with one new active microservice joining the cluster

| instance_id | group_name | start_range | end_range | hb_timestamp | is_leader |
|---|---|---|---|---|---|
| 1 | instance-coordination | 0 | 49 | now( ) | Y |
| 2 | instance-coordination | 50 | 99 | now( ) | N |
| 3 | instance-coordination | −1 | −1 | now( ) | N |

Figure 8:
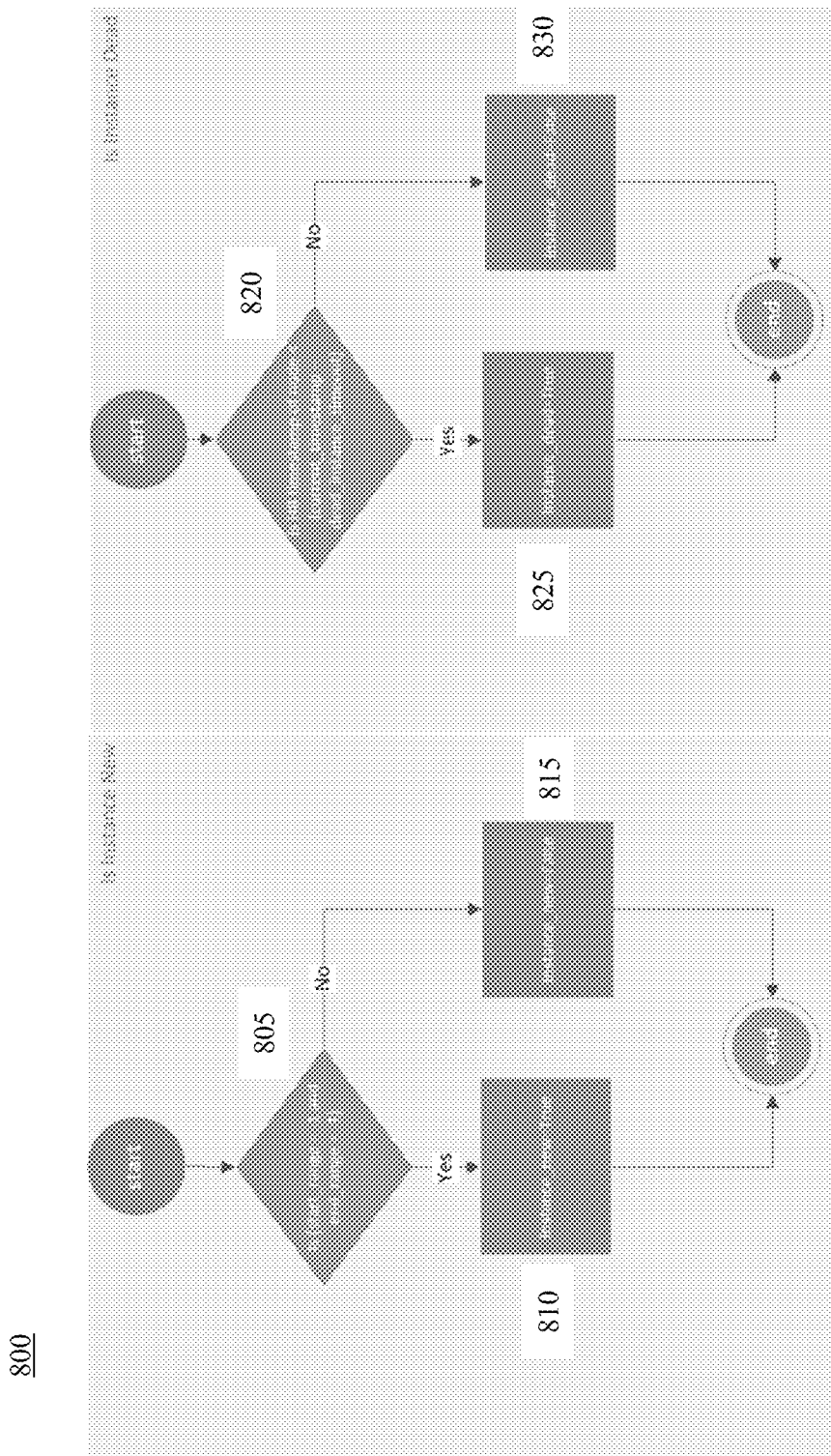
FIG. 8 illustrates a flow diagram for instance status checks, according to an embodiment.

FIG. 8 illustrates a flow diagram 800 for instance status checks in a system and method for utilizing dynamic data partitioning to ensure consistency of event publications with associated business transactions in a distributed microservices architecture in order to optimize efficiency in polling data, according to an exemplary embodiment. On the left side of flow diagram 800, the status check relating to whether an instance is new is illustrated. In operation 805, a determination is made as to whether the value of the start range is −1 and whether the value of the end range is −1. When a determination is made that both values are equal to −1, then in operation 810, it is determined that the instance is new. Conversely, when a determination is made that either value is not equal to −1, then in operation 815, is determined that the instance is not new.

B) On dead instance: When an instance leaves the cluster, the leader may initiate a rebalance of ranges. In an embodiment, the leader may assume that an instance is dead if the heartbeat timestamp is not updated for the configured interval. Table 6 below shows an example of an instance coordinator registry with one dead microservice being evicted from the cluster:

TABLE 6

Instance coordinator registry with one dead microservice (instance #2 is evicted)

| instance_id | group_name | start_range | end_range | hb_timestamp | is_leader |
|---|---|---|---|---|---|
| 1 | instance-coordination | 0 | 49 | now( ) | Y |

TABLE 6-continued

Instance coordinator registry with one dead microservice (instance #2 is evicted)

| instance_id | group_name | start_range | end_range | hb_timestamp | is_leader |
|---|---|---|---|---|---|
| 3 | instance-coordination | 50 | 99 | now( ) | N |

Referring again to FIG. 8, on the right side of flow diagram 800, the status check relating to whether an instance is dead is illustrated. In operation 820, a determination is made as to whether the heart beat timestamp of a particular node is less than a difference between a current timestamp and a dead instance timeout value. When a determination is made that yes, the heart beat timestamp of the particular node is less than this difference, then in operation 825, it is determined that the particular instance is dead. Conversely, when a determination is made that no, the heart beat timestamp of the particular node is not less than this difference, then in operation 830, it is determined that the particular instance is not dead.

Figure 9:
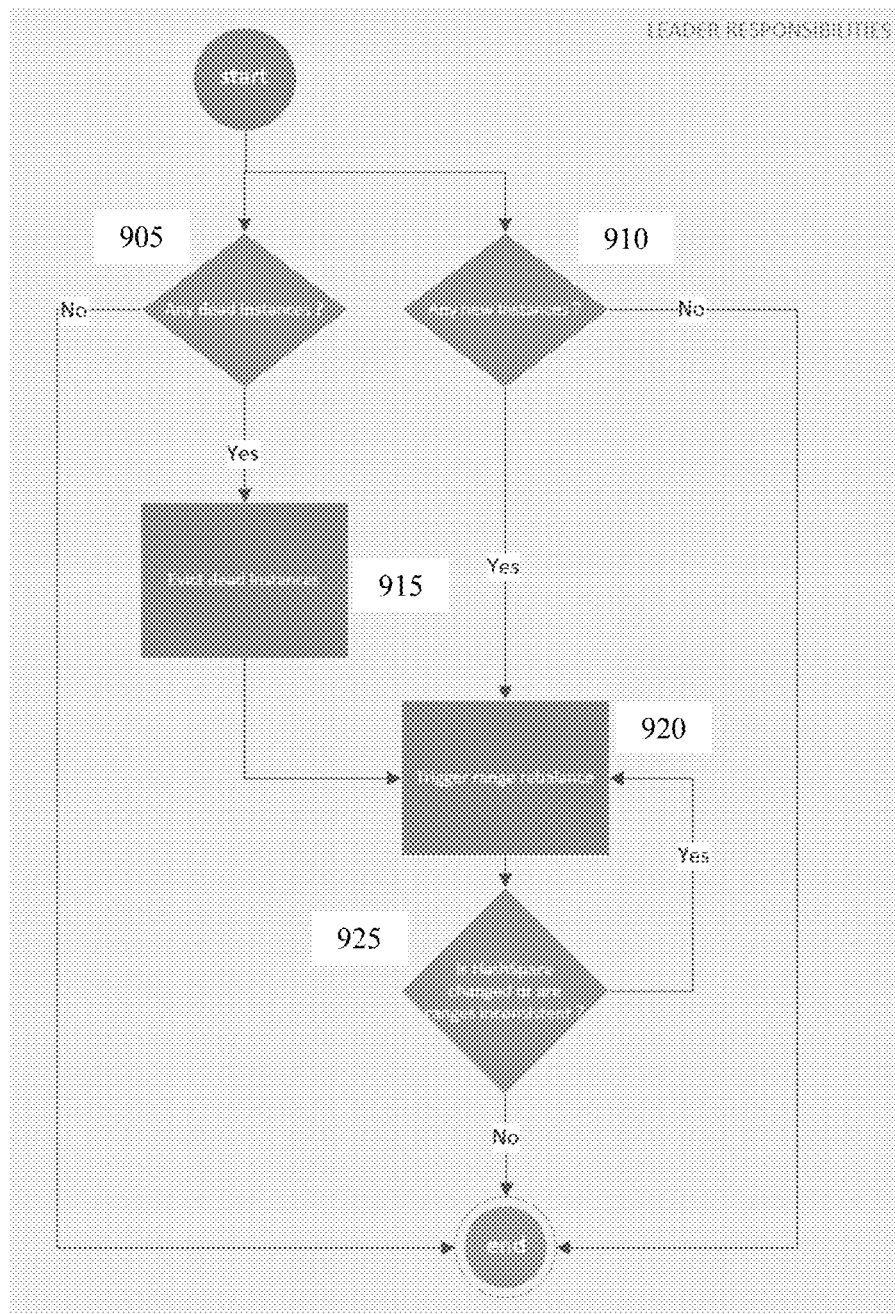
FIG. 9 illustrates a flow diagram for leader responsibilities, according to an embodiment.

C) Range consistency: The leader may verify whether all the hash values are correctly balanced across all active microservices. In an embodiment, the above steps may repeat on every heartbeat signal dynamically allocating and rebalancing the ranges. FIG. 9 illustrates a flow diagram 900 for leader responsibilities in a system and method for utilizing dynamic data partitioning to ensure consistency of event publications with associated business transactions in a distributed microservices architecture in order to optimize efficiency in polling data, according to an exemplary embodiment. In operation 905, a determination is made as to whether there are any dead instances, and in operation 910, a determination is made as to whether there are any new instances. If a determination is made that no, there are no dead instances and/or there are no new instances, then the process 900 ends, as there is no need for rebalancing.

Conversely, when a determination is made that there are dead instances, of at least one dead instance, then at operation 915, the dead instances are evicted, and then, at operation 920, the range rebalancing process is triggered. Similarly, when a determination is made that there are new instances, or at least one new instance, then at operation 920, the range rebalancing process is performed in order to account for the new instances. After the range rebalancing has been completed, then in operation 925, a determination is made as to whether the hash space has changed and/or whether the ranges are inconsistent, and if yes to either query, then the process returns to operation 920 to perform another range rebalancing process. When a determination is made that the ranges are consistent, then the process 900 ends.

Once a start and an end range are allocated to a microservice, the service may be ready to poll for records from the database. Data may be polled for the assigned ranges filtering on the following fields: 1) Status: a status column may be maintained on a data table from which the data is being polled. Referring again to FIG. 5, during polling, only the records with the status as NEW may fetched, as in operations 505, 515, 525, and 535. Once the records are delivered for processing, the status may be updated to either PROCESSED or ERROR upon completion. 2) Hashing mechanism: A) The data table may include a pre-computed hash value column. A hash value may either be a randomly generated value or hashed based on a key, to a value between zero (0) and configured hash space. B) In some embodiments, (row_number % hash_space) may be used instead of a pre-computed hash value column on the data table.

In an embodiment, the data may be polled using the select query with a where clause on the hash value column such that hash value is in between the allocated start and end range.

In an embodiment, several advantages may be provided, including the following: 1) Parallelism: all microservices may poll for records in parallel without any overlap on the virtual data partitions. 2) Efficient resource utilization: each microservice may perform its duties as expected without sitting idle. 3) Uniform data distribution: it may be possible to partition the data uniformly across all partitions. 4) Scalability: it may be possible to scale with the addition of any number of microservices, thus ensuring continued efficiency as the system grows. 5) No redundant reads: it may be possible that no two microservices read or operate on the same set of data.

A first use case may relate to a periodic poll on the database for records to process across microservices. A second use case may relate to a situation by which a scheduler is running on n instances, and instead of locking the scheduler to one instance, schedulers may be operated on all of the instances given that the scheduler is capable of processing the logic that is intended to be performed on a given subset of data. A third use case may relate to developing a platform-independent implementation of an outbox pattern using the instance coordinator.

In some embodiments, the following features may be provided: 1) Use of distributed caching for instance coordinator registry: a distributed cache may be used instead of a database for faster detection of microservice instances. 2) Use of remote procedure calls: service registries may be used for maintaining up-to-date information about microservice instances, thereby improving overall system responsiveness.

Efficient polling of data in a distributed microservices architecture is crucial for maintaining and optimizing system performance. In an embodiment, the use of an instance coordinator with range allocation and a hashing mechanism may address various challenges associated with data retrieval in such environments. The instance coordinator may allocate virtual partitions to each of the active microservices, while the hashing mechanism may virtually partition the data. By implementing this approach, a scalable, resilient, and highly performant microservices architecture for polling data may be achieved.

Accordingly, with this technology, an optimized process for utilizing dynamic data partitioning to ensure consistency of event publications with associated business transactions in a distributed microservices architecture in order to optimize efficiency in polling data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing data partitioning in a distributed microservices architecture, the method being implemented by at least one processor, the method comprising:

defining, by the at least one processor, a first hash space that includes a range of assignable hash values;

deploying, by the at least one processor, a respective instance of each of a plurality of microservices to form a cluster of microservices within the distributed microservices architecture;

allocating, by the at least one processor, a respective subset of the first hash space to each microservice; and facilitating, by the least one processor, a data polling capability with respect to a first data table based on the allocated respective subset of the first hash space and the deployed respective instance for each microservice, wherein the method further comprises determining, based on the deployed respective instance for each microservice, which microservice is a leader of the cluster of microservices and which microservices are followers within the cluster of microservices, and wherein the determining comprises electing the leader based on one from among an assessment of which deployed respective instance is fastest to acquire a lock on the first data table and an assessment of which deployed respective instance has a lowest associated row number.

2. The method of claim 1, wherein the determining comprises electing the leader based on the assessment of which deployed respective instance is fastest to acquire the lock on the first data table.

3. The method of claim 1, wherein the determining comprises electing the leader based on the assessment of which deployed respective instance has the lowest associated row number.

4. The method of claim 1, further comprising:
receiving, from each microservice at a regular time interval, a respective heart beat signal; and
recording, based on the received respective heart beat signal, a corresponding heart beat timestamp.

5. The method of claim 4, further comprising:
determining, when the respective heart beat signal is not received from a particular microservice at the regular time interval, that the particular microservice has left the cluster of microservices; and
reallocating a resized respective subset of the first hash space to each microservice that remains in the cluster of microservices.

6. The method of claim 4, further comprising:
receiving the respective heart beat signal from a newly added microservice that has not previously been included in the cluster of microservices; and
reallocating a resized respective subset of the first hash space to each microservice included in the cluster of microservices based on a presence of the newly added microservice.

7. The method of claim 1, wherein the data polling capability comprises an ability to retrieve, from the first data table, a record having a status indicating that the record is new, and an ability to update the status of the record after retrieval to indicate one from among that the record has been processed and that the record has an error.

8. The method of claim 7, wherein each respective record included in the first data table is associated with a corresponding pre-computed hash value, and wherein the data polling capability further comprises an ability to partition the first data table based on matching each pre-computed hash value with the allocated respective subset of the first hash space for a particular microservice included in the cluster of microservices.

9. A computing apparatus for performing data partitioning in a distributed microservices architecture, the computing apparatus comprising:
a processor;
a memory; and
a communication interface coupled to each of the processor and the memory,
wherein the processor is configured to:
define a first hash space that includes a range of assignable hash values;
deploy a respective instance of each of a plurality of microservices to form a cluster of microservices within the distributed microservices architecture;
allocate a respective subset of the first hash space to each microservice; and
facilitate a data polling capability with respect to a first data table based on the allocated respective subset of the hash space and the deployed respective instance for each microservice,
wherein the processor is further configured to determine, based on the deployed respective instance for each microservice, which microservice is a leader of the cluster of microservices and which microservices are followers within the cluster of microservices, and
wherein the processor is further configured to elect the leader based on one from among an assessment of which deployed respective instance is fastest to acquire a lock on the first data table and an assessment of which deployed respective instance has a lowest associated row number.

10. The computing apparatus of claim 9, wherein the processor is further configured to elect the leader based on the assessment of which deployed respective instance is fastest to acquire the lock on the first data table.

11. The computing apparatus of claim 9, wherein the processor is further configured to elect the leader based on the assessment of which deployed respective instance has the lowest associated row number.

12. The computing apparatus of claim 9, wherein the processor is further configured to:
receive, from each microservice via the communication interface at a regular time interval, a respective heart beat signal; and
record, based on the received respective heart beat signal, a corresponding heart beat timestamp.

13. The computing apparatus of claim 12, wherein the processor is further configured to:
determine, when the respective heart beat signal is not received from a particular microservice at the regular time interval, that the particular microservice has left the cluster of microservices; and
reallocate a resized respective subset of the first hash space to each microservice that remains in the cluster of microservices.

14. The computing apparatus of claim 12, wherein the processor is further configured to:
receive the respective heart beat signal from a newly added microservice that has not previously been included in the cluster of microservices; and
reallocate a resized respective subset of the first hash space to each microservice included in the cluster of microservices based on a presence of the newly added microservice.

15. The computing apparatus of claim 9, wherein the data polling capability comprises an ability to retrieve, from the first data table, a record having a status indicating that the record is new, and an ability to update the status of the record after retrieval to indicate one from among that the record has been processed and that the record has an error.

16. The computing apparatus of claim 15, wherein each respective record included in the first data table is associated with a corresponding pre-computed hash value, and wherein the data polling capability further comprises an ability to partition the first data table based on matching each pre-computed hash value with the allocated respective subset of the first hash space for a particular microservice included in the cluster of microservices.

17. A non-transitory computer readable storage medium storing instructions for performing data partitioning in a distributed microservices architecture, the storage medium comprising executable code which, when executed by a processor, causes the processor to:
define a first hash space that includes a range of assignable hash values;

deploy a respective instance of each of a plurality of microservices to form a cluster of microservices within the distributed microservices architecture;

allocate a respective subset of the first hash space to each microservice; and facilitate a data polling capability with respect to a first data table based on the allocated respective subset of the first hash space and the deployed respective instance for each microservice, wherein when executed, the executable code further causes the processor to determine, based on the deployed respective instance for each microservice, which microservice is a leader of the cluster of microservices and which microservices are followers within the cluster of microservices, and wherein when executed, the executable code further causes the processor to elect the leader based on one from among an assessment of which deployed respective instance is fastest to acquire a lock on the first data table and an assessment of which deployed respective instance has a lowest associated row number.

* * * * *